Figure 1:
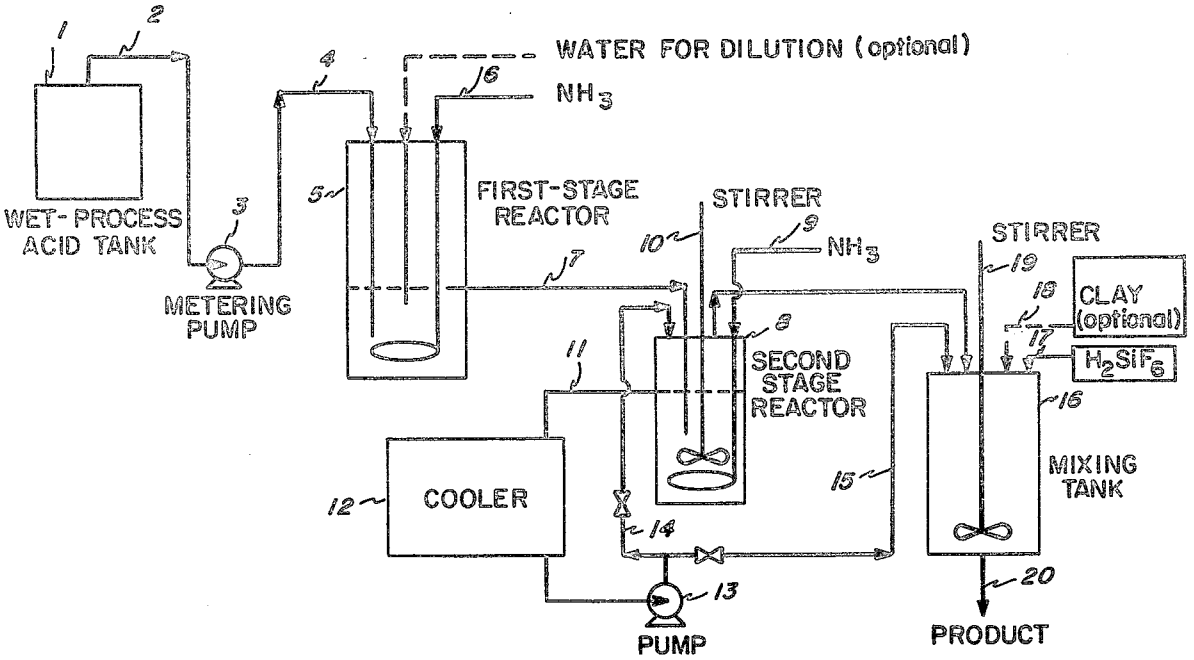

United States Defensive Publication [19] (H) [11] T986,001

Jones et al. [43] Sep. 4, 1979

[54] PRODUCTION OF SUSPENSION FERTILIZERS FROM ORTHOPHOSPHORIC ACID

[75] Inventors: Thomas M. Jones; John M. Stinson, both of Sheffield, Ala.

[73] Assignee: Tennessee Valley Authority

[21] Appl. No.: 947,684

[22] Filed: Oct. 2, 1978

[51] Int. Cl.[2] ..... C05B 7/00

[52] U.S. Cl. ..... 71/37; 71/43; 71/64 C

[57] ABSTRACT

An improved process for production of concentrated high-analysis nitrogen-phosphate base suspension fertilizer by ammoniation of wet-process or other orthophosphoric acids in two stages. The process improvement involves the addition of a small amount (0.1–0.5 percent) of a crystal modifier, fluosilicic acid, for prevention of settling of crystals in the suspension during vibration such as that which occurs during shipment. With use of the crystal modifier, the monoammonium phosphate crystals formed are small and needlelike, and suspension fertilizers with excellent shipping, storage, and handling properties are produced with an $N:P_2O_5$ weight ratio in the range of highest solubility, about 0.27 to 0.33.

7 Claims, 1 Sheet Drawing,

27 Pages Specification

The file of this unexamined application may be inspected and copies thereof may be purchased (849 O.G. 1221, Apr. 9, 1968).

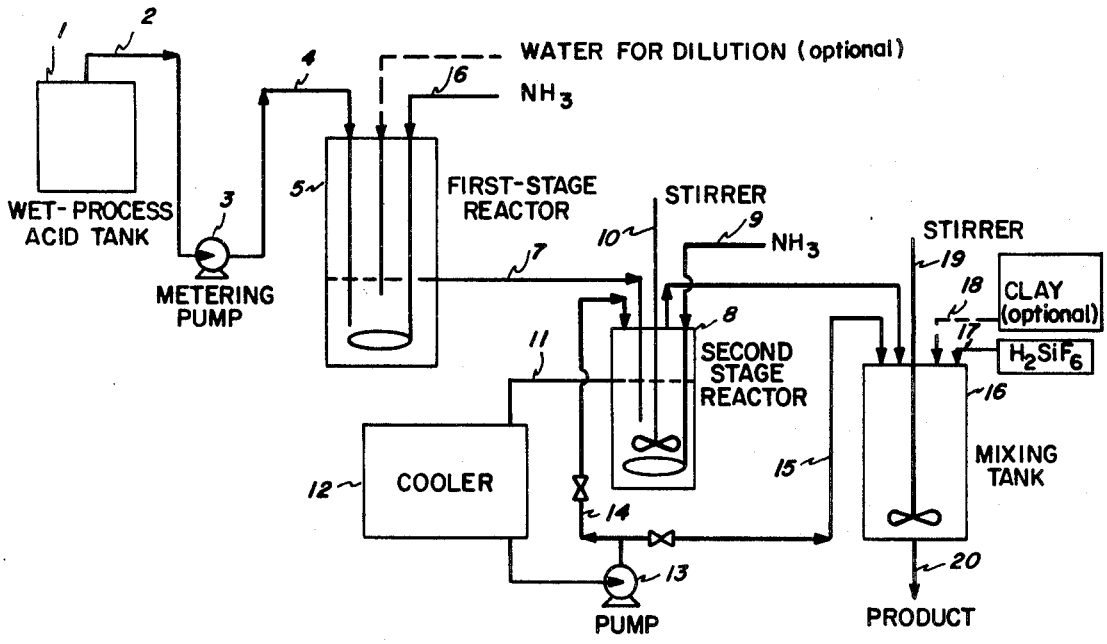

PRODUCTION OF AMMONIUM PHOSPHATE SUSPENSION FERTILIZERS BY A TWO-STAGE CONTINUOUS AMMONIATION PROCESS